United States Patent

Tadokoro

[19]

[11] Patent Number: 5,865,640
[45] Date of Patent: Feb. 2, 1999

[54] APPARATUS HAVING A LOCKING MECHANISM THAT LOCKS A CONNECTOR OF A PERIPHERAL DEVICE THERETO

[75] Inventor: Yoshikazu Tadokoro, Ayase, Japan

[73] Assignee: Ricoh Company, Ltd., Tokyo, Japan

[21] Appl. No.: 856,181

[22] Filed: May 14, 1997

[30]     Foreign Application Priority Data

May 31, 1996  [JP]  Japan ................................. 8-137852

[51] Int. Cl.⁶ ..................................................... H01R 4/50
[52] U.S. Cl. ............................................ 439/347; 439/911
[58] Field of Search .................................. 439/347, 350, 439/310, 372, 502, 638, 911

[56]              References Cited

U.S. PATENT DOCUMENTS

| 5,480,319 | 1/1996 | Vlakancic ................................ 439/347 |
| 5,603,630 | 2/1997 | Villain ..................................... 439/347 |
| 5,641,299 | 6/1997 | Meguro et al. .......................... 439/347 |
| 5,711,558 | 1/1998 | Woody ................................ 439/347 X |

FOREIGN PATENT DOCUMENTS 2 589 013  10/1986  France .

7-141059   6/1995   Japan .

*Primary Examiner*—Khiem Nguyen
*Attorney, Agent, or Firm*—Oblon, Spivak, McClelland, Maier & Neustadt, P.C.

[57]                ABSTRACT

An apparatus that lockably connects a connector of a peripheral device to the apparatus. The apparatus includes an apparatus body having a receptacle portion that receives the connector and a locking mechanism that locks the connector in place in response to a main switch of the apparatus being turned ON. The locking mechanism includes latching members that are connected to a connecting arm and at least one of the latching members being connected to the main switch. By moving the main switch, portions of the respective latching members enter the receptacle portion and lock the connector in place. The apparatus optionally includes a control device that controls whether a signal flows to the receptacle portion based on if the connector is detected as being locked in place. Also, the invention optionally includes a compulsory unlocking mechanism and provisions for allowing the connector to be inserted into the receptacle even though the main switch is in the ON position.

16 Claims, 8 Drawing Sheets

APPARATUS HAVING A LOCKING MECHANISM THAT LOCKS A CONNECTOR OF A PERIPHERAL DEVICE THERETO

BACKGROUND OF THE INVENTION

1. Field of the Invention

The present invention relates to apparatuses that include connectors that are configured to automatically connect and disconnect peripheral devices to and from the apparatuses. More particularly, the present invention relates to apparatuses such as portable information devices, like a portable personal computer, etc., that includes a locking/unlocking mechanism that facilitates connection with a peripheral alternating current (AC) adapter, which provides direct current (DC) power to the respective apparatuses.

2. Description of Background

Portable personal computers include an internal power source in the form of a battery that provides DC power used to operate the portable personal computers. These personal computers include an external (i.e., auxiliary or peripheral) AC adapter that provides the personal computer with a source of DC power, in the form of an electrical current. The DC power source recharges the internal battery and/or provides the primary power source for operating the personal computer. Connection between the AC adapter and the portable personal computer is accomplished by inserting a DC connector portion of the AC adapter into a female connector (i.e., a receptacle) formed in a body of the personal computer.

When the female connector receives the DC connector, the DC connector is held in place by a frictional force between the female connector and the DC connector. The frictional force is often insufficient to hold the two connectors in place, and if inadvertently bumped or jostled, may result in loss of power (and perhaps loss of data) as a result of the two connectors becoming disconnected from one another.

FIG. 8 is derived from Japanese patent application laid open (KOKAI) No 7-141059 and shows an example background art locking mechanism that is configured to prevent an inadvertent disconnection of the DC connector. FIG. 8 is a detailed view showing a conventional AC adapter assembly having an AC adapter portion 81 and a DC connector 82. A locking mechanism 83 is included in the DC connector 82 to prevent the DC connector 82 from inadvertently becoming detached from a personal computer or the like. Removal of the DC connector 82 requires a user to depress a button 83a which lowers a locking switch 84 that interlocks with a female connector portion of the personal computer. Without depressing the button 83a, the DC connector 82 cannot be removed from the female connector.

As identified by the present inventors, the conventional locking mechanism if the DC connector 82 is large and complex. Furthermore the AC adapter portion supplies an electric power to the personal computer via the female connector even if the power to the personal computer is turned off, thus wasting energy by perpetually attempting to maintain a peak charge in the internal battery at all times.

FIG. 9 is a schematic block diagram of the device shown in FIG. 8. The DC connector 82 is shown connecting to an apparatus 100. A cable 106 carries a ground line (GND) and a DC line (+DC). The cable 106 connects the AC adapter 81 to the DC connector 82. Within the AC adapter 81, a control circuit 102 is connected to a rectifier 104 that rectifies an AC an provides an output DC voltage on the DC line (+DC). The control circuit 102 connects to a third conductor which is shown contacting the GND line via the locking switch 84. The control circuit 102 senses when the DC connector connects to the apparatus 100 via the locking switch 84 and controls a switch 108 to close when contact is made.

One limitation with this conventional device is that it will allow power to be drawn to the apparatus 100 even if the main power switch to the apparatus 100 is turned off. Another limitation is that every connector 82 that connects to the body 100 must have a complex mechanism that includes the button 83a. Furthermore, contact is only made at the single location of the locking switch 84, and thus the integrity of this connection depends upon the button 83a maintaining its resiliency.

Consequently, the present inventors have determined that a need exists for a compact locking mechanism that automatically locks and unlocks a DC connector portion (having a simplified structure) of an AC adapter when a device to which the AC adapter is connected, is turned ON and OFF, respectively. Furthermore, the present inventors have determined a need exists for identifying an AC adapter that does not draw AC power when the device is not being used (i.e., not turned-ON).

SUMMARY OF THE INVENTION

Accordingly, one object of the present invention is to provide a novel apparatus having a locking mechanism that overcome the above-identified problems identified with conventional devices.

Another object of the present invention is to provide an apparatus having an AC adapter with a DC connector that is compact in size and easily manufacturable.

A further object with the present invention is to provide an AC adapter with a DC connector that is configured to consume no electric power when a device to which the AC adapter is attached is not in use.

A further object of the invention is to provide an AC adapter having a DC connector portion that is locked and unlocked automatically under control of a main on/off switch of a device to which the AC adapter is connected.

These and other objects are accomplished with an apparatus having a novel locking mechanism adapted for use with an AC adapter which supplies a DC power source through a DC connector portion of the AC adapter according to the present invention. The apparatus includes a locking mechanism that locks the DC connector portion of the AC adapter in place in response to switching a main power switch of the apparatus to an "ON" position. Moving the main switch mechanically locks the DC connector portion in a receptacle in the apparatus by engaging an interlocking member connected to the main switch with the DC connector, when the DC connector is placed in the receptacle connector. Because the DC connector is locked in place when the apparatus is turned ON, the DC connector cannot be inadvertently removed, and thus an accidental power-down condition is avoided. The receptacle connector also unlocks the DC connector when the power switch is placed in an OFF position.

According to a second aspect of the present invention, the above-described apparatus ceases to receive DC power from the DC connector even though the DC connector may not have been removed from the receptacle connector. Consequently, a power draw from the AC adapter ceases when power to the apparatus is turned OFF at the main power switch.

The locking/unlocking aspect of the receptacle cooperates with a part of the main switch which actuates the locking/ unlocking mechanism. The locking/unlocking aspect also includes a first latching member which is received by a depression area formed in a circumferential area of the DC connector, a second latching member which faces the first latching member and is received in the depression area of the DC connector, a crank or connecting arm for changing direction of motion of the first and second latching mechanisms as controlled by a movement of the main switch.

According to another aspect of the present invention, latching portions of the locking mechanism include a tapered portion with a predetermined inclination and being configured to engage the DC connector, when the AC adapter is inserted into the receptacle. The locking mechanism also includes a spring portion which pushes the tapered portion against the DC connector of the AC adapter with a predetermined force, and is retracted by an opposite force when the DC connector is inserted, after the main switch is already ON.

In accordance with another aspect of the present invention, the above mentioned apparatus is provided with a compulsory unlocking mechanism that unlocks the locking mechanism and the DC connector when the main switch is in the "ON" position.

In the above apparatus, the main switch (i.e., power switch) is included in a body of the apparatus and a portion of which is used to actuate the locking mechanism. For example, the latching mechanism is provided inside a body of the main switch body and is configured to fit in a depression provided to the DC connector when the latching mechanism is slid into position automatically by an operator sliding the main switch to an "ON" position. When in position, the DC connector is locked in position. If the main switch is switched to an "OFF" position, each latching member is automatically retracted from the depression in the DC connector so that the DC connector may be removed from the receptacle in the main body of the apparatus. Accordingly, because the above structure uses the main switch to cooperate with the DC connector locking mechanism, a number of the component parts is kept to a minimum thereby resulting in small size and ease of manufacture.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
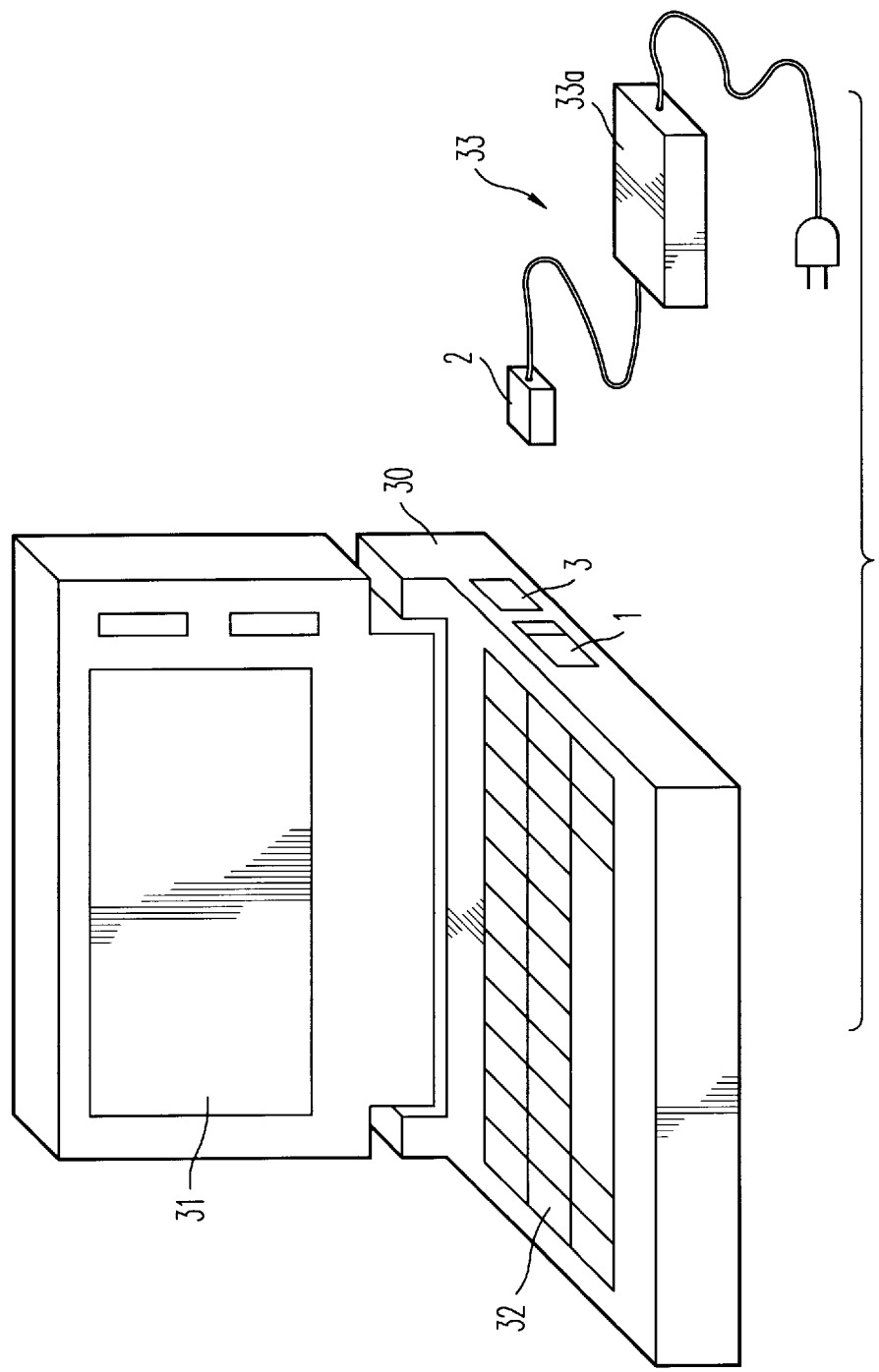
FIG. 1 is a perspective view of a portable personal computer that connects to an AC adapter in accordance with a first embodiment of the present invention.

Referring now to the drawings, wherein like reference numerals designate identical or corresponding parts throughout the several views, and more particularly to FIG. 1 thereof, there is illustrated a system diagram showing how component parts of the present invention interrelate to one another. A portable personal computer 30, such as a notebook computer is illustrated as an apparatus to which a peripheral device is to be connected. While the portable personal computer 30 is described for illustrative purposes, the present invention is applicable in other applications as well that require physical and electrical interconnection between two devices. Furthermore, the electrical interconnection need not be only for power purpose, but also for communication purpose such as for the exchange of electrical signals. The portable personal computer 30 includes a liquid crystal display (LCD) screen 31 serving as a display and a keyboard 32 serving as a data input device.

The portable personal computer 30 also includes a receptacle 3, serving as an insert port, that receives a DC connector 2 portion of an AC adapter assembly 33. The receptacle 3 and the main switch 1 cooperate with one another to serve as a locking mechanism for locking the DC connector 2 in place when the main switch 1 is placed in an "ON" position. In particular, a user inserts the DC connector 2 of the AC adapter 33 into the receptacle 3 of the portable personal computer 30 when the user wishes to operate the portable personal computer 30 via DC power provided from the AC adapter 33. After the DC connector 2 is inserted, the user slides the main switch 1 forward, toward the receptacle 3, to an "ON" position. In the "ON" position, a portion of the main switch 1 that is internal to the portable personal computer 30 locks the DC connector 2 in place so that the DC connector 2 cannot be inadvertently or intentionally removed without first returning the main switch 1 to an "OFF" position.

Figure 2:
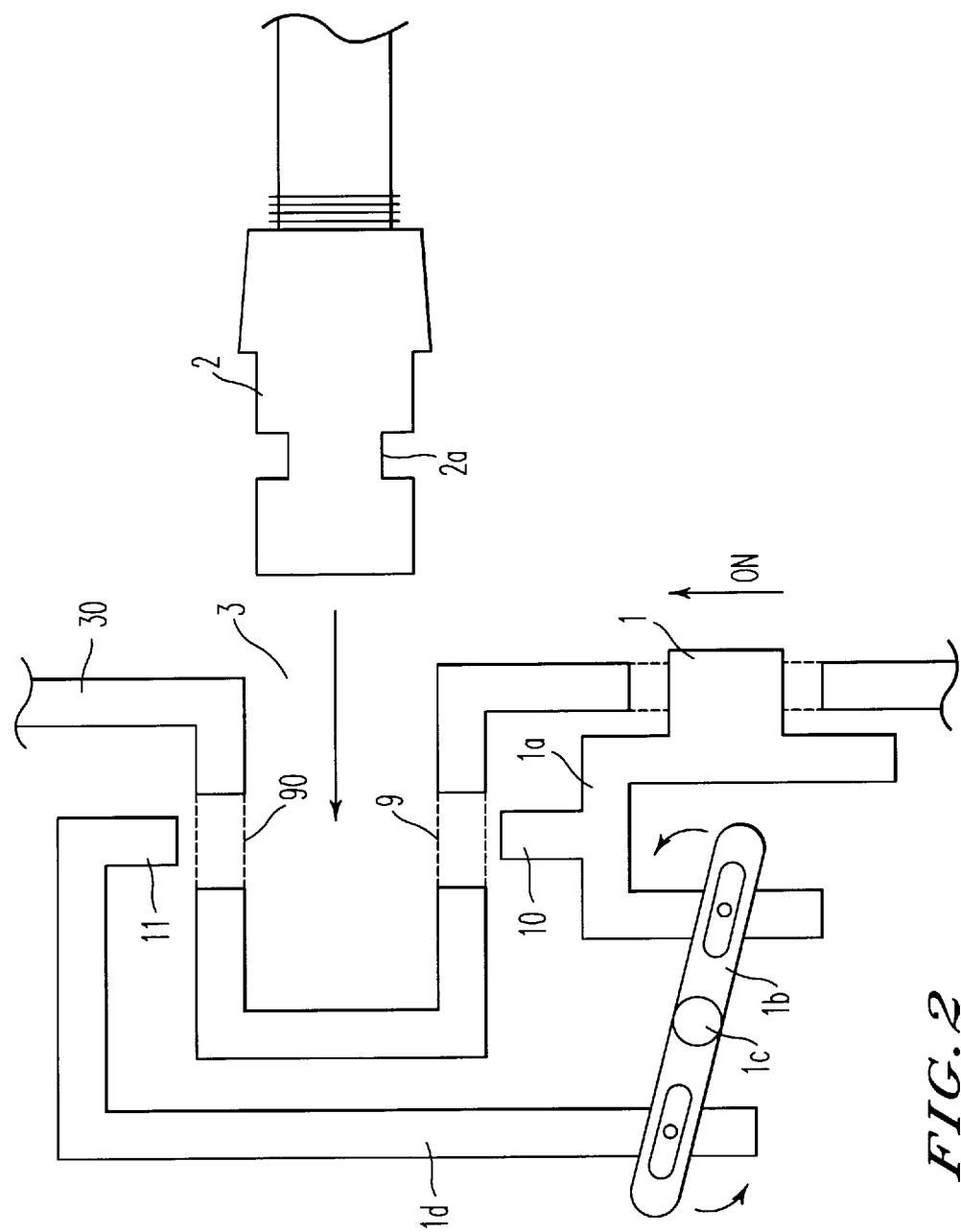
FIG. 2 is a plan view of a cross-section of a receptacle and locking mechanism when separated from a DC connector of an AC adapter according to the first embodiment of the present invention.
Figure 3:
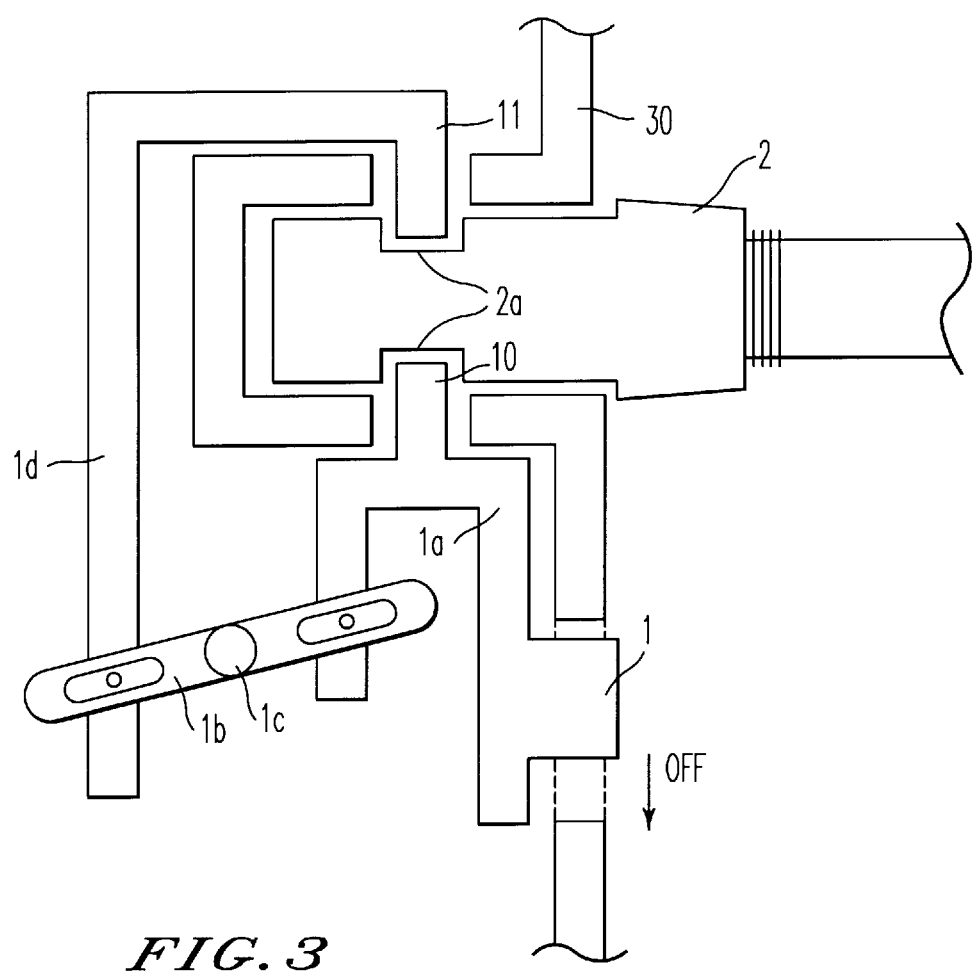
FIG. 3 is the same view as that shown in FIG. 2, except the DC connector is locked in the receptacle of the personal computer.

FIGS. 2 and 3 are cross-section views showing structural features of the first embodiment. FIG. 2 illustrates a condition when the main switch 1 is in an OFF-position and the DC connector 2 has not yet been placed into the receptacle 3. FIG. 3 is similar to FIG. 2, but shows a condition where the main switch 1 is placed in an ON-position after the DC connector 2 is inserted into the receptacle 3.

As shown in FIGS. 2 and 3, the main switch 1 is provided with a latching member 1a that is used to lock the DC connector 2 in place when the main switch 1 is moved to the "ON" position. The latching member 1a includes a latching portion 10 that is positioned opposite to a passageway 9 formed at a side portion of the receptacle 3. The passageway 9 is of sufficient size to allow the latching portion 10 to pass through the passageway 9 when the main switch is slid to the ON-position.

Pivotally connected to the latching member 1a is one end of an arm 1b that is configured to rotate around a fixed arm shaft 1c, where the arm shaft 1c is fixed to the computer 30. The other end of the arm 1b is pivotally connected to a j-shaped project member 1d, which serves as a second latching member. As is evident from FIG. 2, sliding the main switch 1 to an ON-position will result in urging the arm 1b to force the latching potion 10 to move into the passageway 9; a second latching portion 11 that is formed at an end of the j-shaped project member 1d, as shown, will be urged by the main switch 1 via the arm 1b to move in an opposite direction so as to move the second latching portion 11 into an opposing passageway 90.

Also seen from FIG. 2 is that the DC connector 2 includes recessed portions 2a (also called depressions). The respective sizes of the recessed portions 2a are of sufficient size to receive the latching portions 10 and 11 when the DC connector 2 is placed in the receptacle 3 and the main switch 1 is slid to the ON-position. The recessed portions 2a may be formed in a continuous fashion around a circumference of the connector 2. In this first embodiment, the locking mechanism includes the project members 1a, 1d, the arm 1b, the arm shaft 1c, the latching portion 10, and the second latching portion 11 of the j-shaped project member 1d.

As shown FIG. 3, when the main switch 1 is slid to the ON-position, the latching portion 10 of a project member la passes through the passageway 9 and is received by one of the recessed portions 2a in the DC connector 2 (or in the single recessed area 2a if the recessed portion is continuous). Similarly, the other latching portion 11 of the j-shaped project member 1d passes through the passageway 90 and is received by another one of the recessed portions 2a in the DC connector. Thus, by moving the main switch 1 into the ON-position, the connector 2 is automatically locked in the receptacle 3 of the portable personal computer 30. Similarly, if the main switch is slid to the OFF-position, the locking portions 10 and 11 are retracted from the recessed portions 2a, and consequently, the DC connector 2 is automatically unlocked. According to this automatic locking and unlocking arrangement, the DC connector cannot be inadvertently removed unless the main switch 1 is placed in the OFF-position.

While not expressly shown in FIGS. 2 and 3, it is to be understood that the receptacle 3 will include "pins" or other suitable devices for electrically interfacing with the power (or electrical or even optical signals) provided by the peripheral device that connects to it. In the present embodiment, the receptacle 3 includes a socket into which a DC pin in the DC connector connects.

The j-shaped latching member 1d is electrically grounded to the portable personal computer 30. Similarly the recession 2a of the DC connector 2 carries a line from a control circuit 34 that detects if the DC connector is connected to the portable personal computer 30, as will be discussed with respect to FIG. 4. However, the point to be made is that when the main switch 1 is slid to an ON-position, the latching portion 11 of the j-shaped latching member id makes electrical contact with the recession 2a of the DC connector 2, thereby creating a detectable event that signifies to the AC adapter 33a that a connection has been made.

Figure 4:
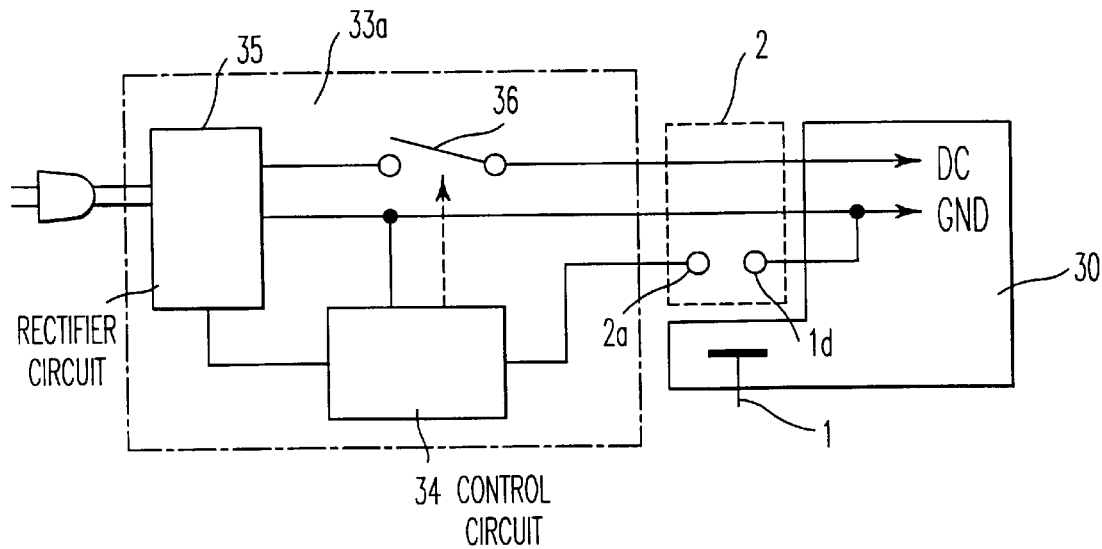
FIG. 4 is a block diagram of an electric connecting circuit of the portable personal computer in FIG. 1 and the AC adapter.

FIG. 4 is a circuit diagram that shows how the AC adapter portion 33a, DC connector 2 and portable personal computer 30 interrelate. As shown in FIG. 4, the AC adapter portion 33a includes a rectifier circuit 35 that converts an AC power signal into a regulated DC voltage signal. The rectifier circuit 35 operates under control of a control circuit 34. Furthermore, the control circuit 34 employs a controller (such as a microprocessor operatively connected to a semiconductor memory) and a sensor that cooperate with one another to sense if the recessed portion 2a of the DC connector 2 is connected to the j-shaped latching member 1d. When the control circuit 34 detects that the recession 2a is connected with the ground of the portable personal computer 30, the control circuit 34 causes a switch 36 to close. As shown in FIG. 4, the switch 36 is placed in series in a DC voltage line such that if the switch 36 is open, then no DC current will flow to the portable personal computer 30. However, when the switch 36 is closed, then DC current will flow to the portable personal computer 30 via the DC connector 2.

Moreover, the control circuit 34 detects when the recession 2a of the DC connector is in an open condition with respect to an electrical ground of the portable personal computer 30, and keeps the switch 36 in an open condition as long as the recessed portion 2a and the portable personal computer 30 are electrically isolated. In this way, no current is drawn from the rectifying circuit 35, and thus, no power is wasted, even though the connector 2 may be positioned in the receptacle 3. However, the control circuit 34 also detects when to supply the DC output of the rectifying circuit 35 to the portable personal computer 30 by monitoring when a connection is made between the recessed portion 2a and the personal portable computer 30. The sensor in the control circuit 34 may operate by any number of ways such as providing a slight voltage on the line connected to the recessed portion 2a and sensing when a current draw or voltage drop is observed as a result of grounding the recessed portion 2a to the ground of the portable personal computer 30.

Figure 5:
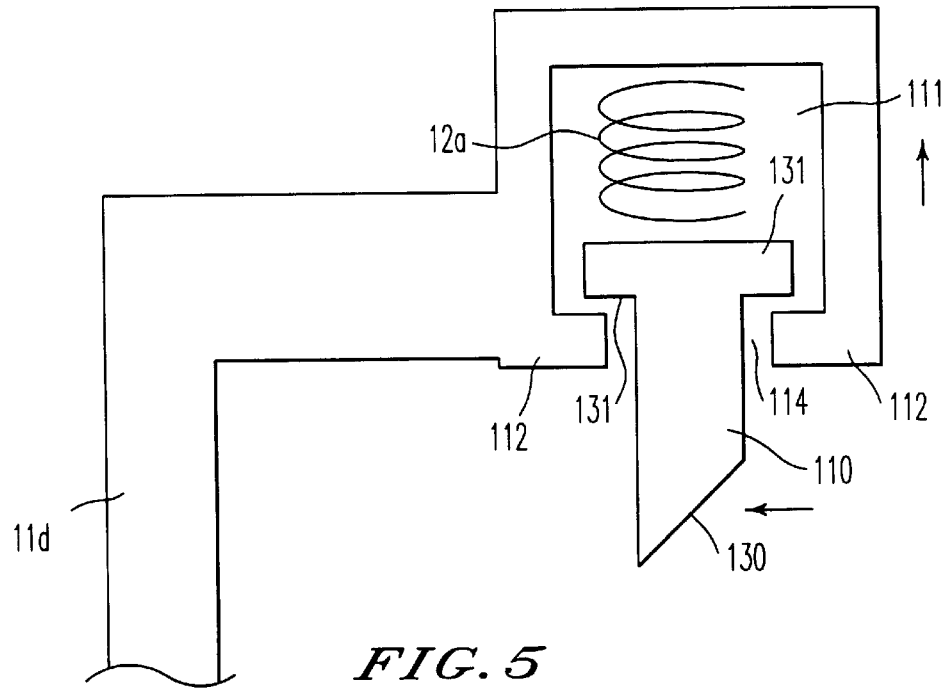
FIG. 5 is a plan view of a cross-section of a latching mechanism according to a second embodiment of the present invention.

FIG. 5 illustrates a second embodiment of an automatic locking mechanism according to the present invention. A function served by this locking mechanism is to allow the DC connector 2 to be inserted into the receptacle 3 after the main switch 1 has already been slid into the ON-position. In this way, if the internal battery of the portable personal computer 30 is running low on stored charge, the DC connector may be inserted into the receptacle for operating the portable personal computer 30 on external power, without first turning OFF the main switch 1.

The cross-sectional view of FIG. 5 shows a detailed structure of the latching member according to the present embodiment. A modified j-shaped project member lid corresponds to the j-shaped project member 1d of the first embodiment, although is modified by having a cavity 111 formed at an end thereof as shown in FIG. 5. Contained within the cavity 111 is a spring member 120 which urges a tapered latching portion 110 toward a lip 112 of an opening 114 formed on one side of the cavity 111. One end of the tapered latching portion 110 has a stop portion 131 formed therein that has a larger size than a than the opening 114 so that the spring member 120 does not push the entire tapered latching portion 110 out of the cavity 111.

The end of the tapered latch portion 110 opposite to the stop portion has a tapered shape, and thus is called the tapered end 130. Although not shown in FIG. 5, it is to be understood that another tapered latch portion 110 with another tapered end 130 is formed on the other side of the receptacle 3 that is closest to the main switch 1. In this configuration, even while the main switch 1 is in an ON position, and the tapered end 130 extends into the passageway 90 (FIG. 1) and the receptacle 3, the operator may insert the DC connector 2 into the receptacle 3 because the tapered latch portion 110 will retract into the passageway 90 against the resilient force of the spring member 120. Furthermore, once the DC connector 2 is pushed sufficiently far into the receptacle 3, and the tapered end 130 is aligned with the recessed portion 2a, the resilient force of the spring member 120 will urge the tapered latch portion to move into the recessed portion 2a, thereby automatically locking the DC connector 2 in place until the main switch 1 is turned to the OFF position.

As was discussed with respect to FIG. 4, when the control circuit 34 senses that the tapered end 130 is engaged in the recessed portion 2a, the control circuit 34 will initiate a DC current flow by switching the switch 36 to the closed position.

Figure 6:
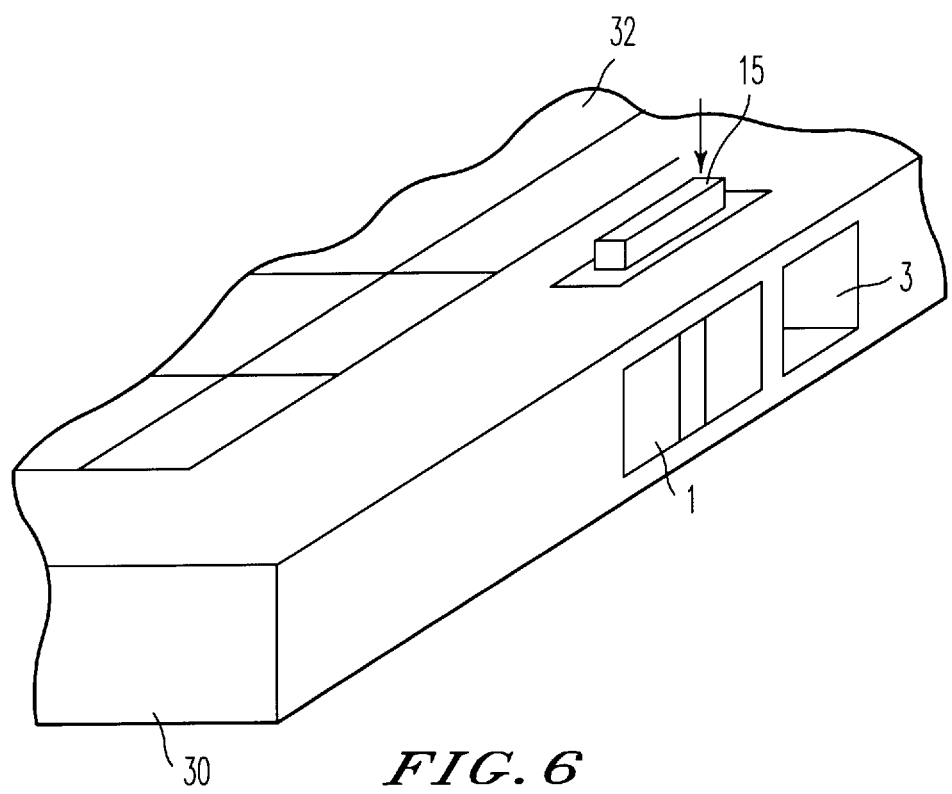
FIG. 6 is a perspective view of a portable personal computer which is provided with a compulsory unlocking mechanism according to a third embodiment of the present invention.
Figure 7A:
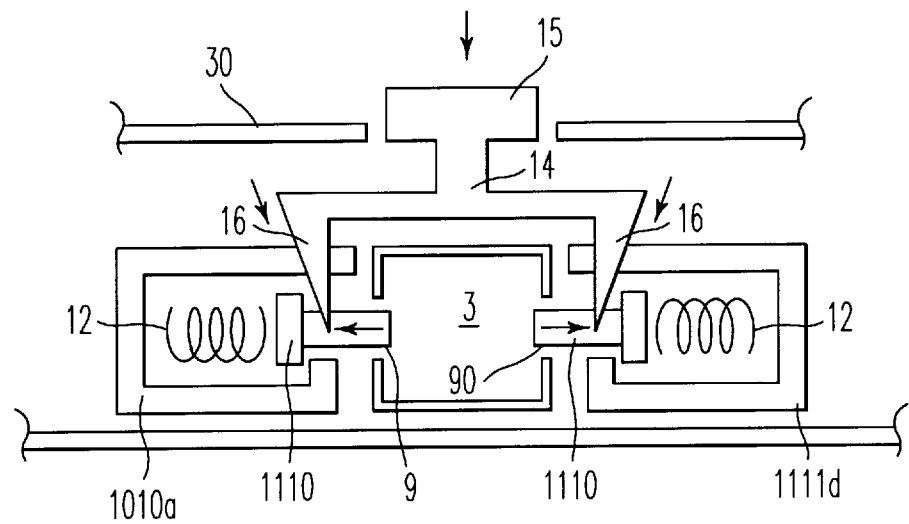
FIGS. 7A and 7B are detailed cross-sectional and perspective views of the compulsory unlocking mechanism shown in FIG. 6.
Figure 7B:
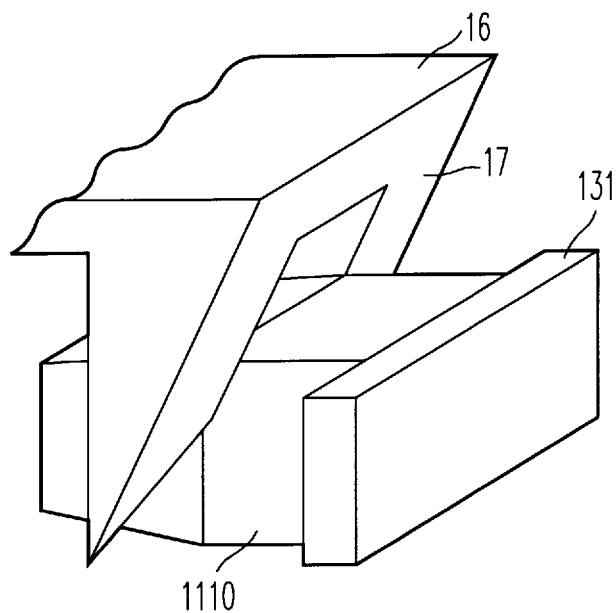
Figure 8:
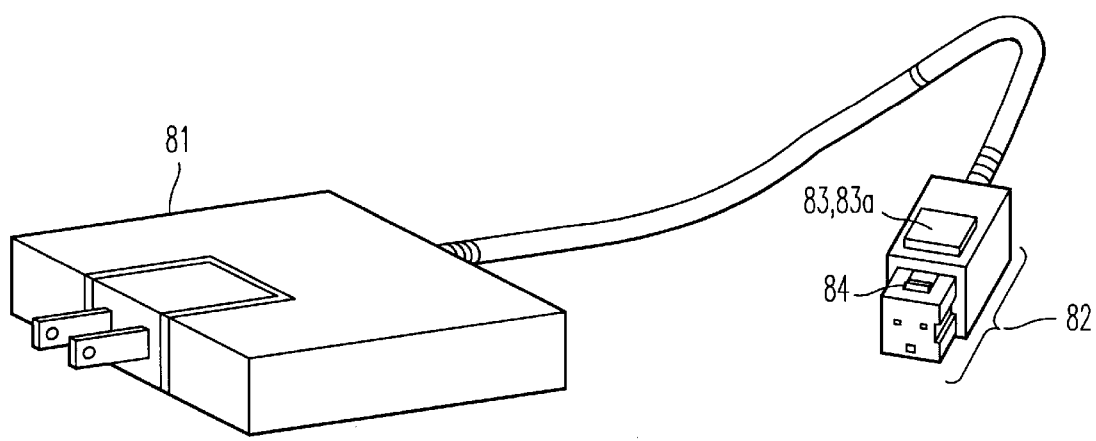
FIG. 8 is a perspective view of a conventional AC adapter having a conventional locking/unlocking mechanism.
Figure 9:
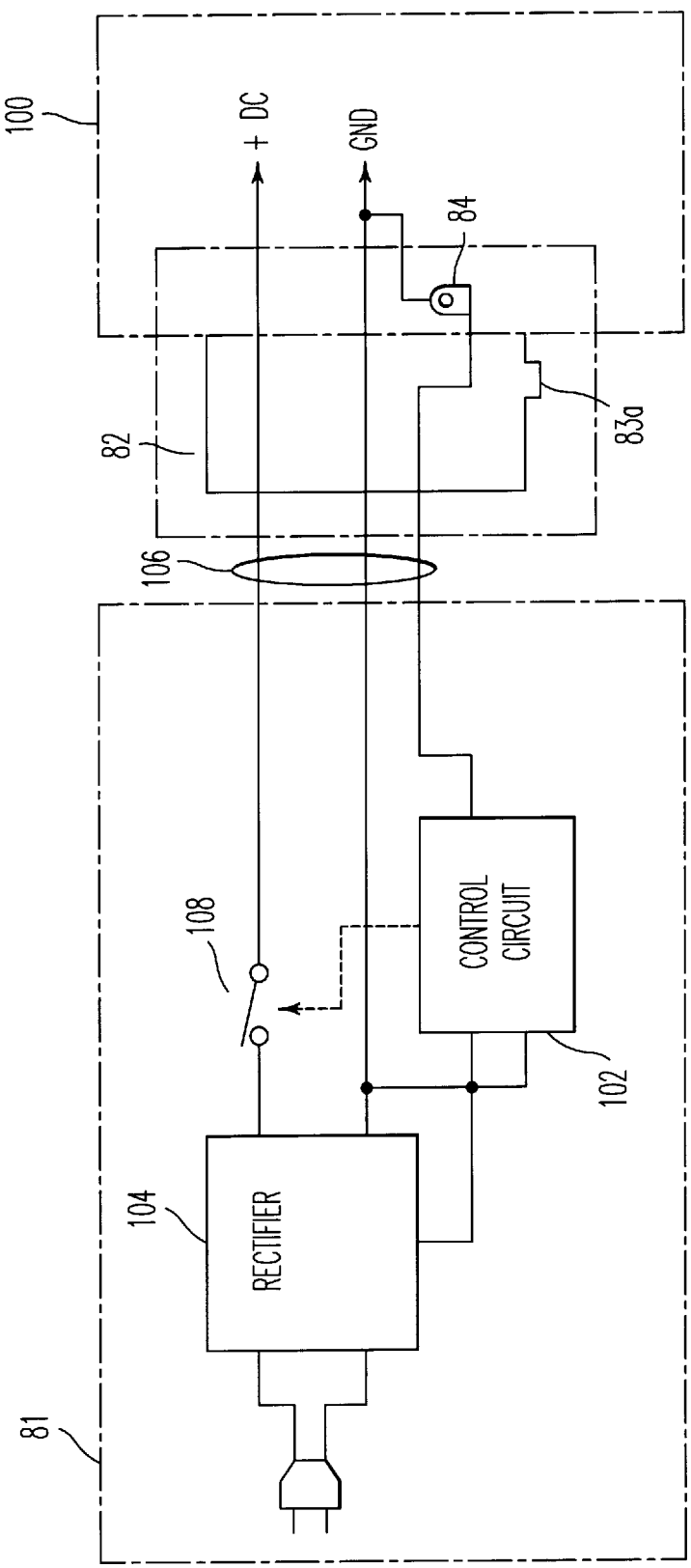
FIG. 9 is a perspective view of a control circuit of a conventional AC adapter.

A third embodiment is now described with respect to FIGS. 6, 7A and 7B. The locking mechanism according to this third embodiment allows the DC connector 2 to be removed from the receptacle 3 even though the main power switch 1 is in the ON position. FIG. 6 is a detailed view of the portable personal computer 30 with a button 15 is disposed on a horizontal surface of the portable personal computer 30 near the keyboard 32 and over the main switch 1 and receptacle 3. In this configuration, a user may conveniently depress the button 15 to unlock the DC connector 2.

FIG. 7A shows a cross-section of a compulsory unlocking mechanism 14 that includes the button 15 and two unlocking latching portions 16, each of which have a tapered face portion 17. In normal operation, when the main switch 1 is in the OFF position, a modified latching member 1010a causes a latching portion 1110 (which may be a tapered latching portion like element 110 of the second embodiment) to be withdrawn from the passageway 9. Similarly, a modified j-shaped latching member 1111d (which is optionally connected to arm 1b, although not shown in FIG. 7A) causes the other latching portion 1110 to be withdrawn from the passageway 90.

When the main switch 1 is in the ON position and an operator depresses the button 15, the unlocking latching portion 16 in the compulsory unlocking member 14 contacts the latching portions 1110 of the latching members 1010a and 1111d and urges the latching portions 1110 to retract into the respective passageways 9 and 90. When the operator releases the button 15, the spring members 12 urge the latching members 1010a and 1111d back through the passageways 9 and 90 and into the receptacle 3. In this way, the DC connector 2 may be removed from the receptacle 3 even though the main power switch 1 is in the ON position. Similarly, the latching members 1010a and 1111d may have tapered ends (as discussed with respect to the second embodiment) so that the DC connector may be inserted after the main switch is slid to the ON-position, without the operator having to depress the button 15. Otherwise, if the latching members 1010a and 1111d are not connected to the main switch 1, the operator must depress the button 15 to insert and remove the receptacle 2. Because a staying force of the main switch 1 (FIG. 1) is greater than that of the springs 12, the main switch 1 will not switch to the OFF position when the button 15 is depressed.

FIG. 7B is a perspective view showing how the tapered face 17 is formed to straddle the latching portions 1110 so that the tapered face 17 contacts a lip 131 of the latching portions 1110. As seen in FIG. 7B, the tapered face 17 will urge the latching portion 1110 away from the tapered face 17 when the button 15 is depressed.

One advantage of the present invention is that the main switch 1 cooperates with, and actually includes, one piece of the locking mechanism of the DC connector 2, and consequently a number of the parts of the body of the portable personal computer 30 does not increase with respect to conventional locking devices. Furthermore, the locking mechanism of the present invention is compact and very manufacturable. Moreover, a user can lock the DC connector 2 in the portable personal computer 30 and turn the power ON with one simple operation.

The present invention is not limited to the above-described embodiments, and many widely different embodiments of the present invention may be constructed without departing from the spirit and scope of the present invention. For example, the present embodiment explains a case where the apparatus that receives the DC connector 2 is a portable personal computer 30, but the present invention can apply to other apparatuses using an AC adapter (or even other connectors) which are, for example, portable information devices, for example a word processor or a personal digital assistant.

In accordance with the present invention, the DC connector of the AC adapter becomes compact and simple, and avoids consuming electric power from the AC adapter when the apparatus is not in use.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An apparatus that lockably connects a connector of a peripheral device thereto, said apparatus comprising:

an apparatus body having a receptacle formed in an internal portion of said apparatus body, said receptacle having a generally hollow internal portion defined by at least two opposing side portions with respective passageways formed therethrough and a receptacle opening of sufficient size to receive said connector and an electrical current therefrom;

a locking mechanism disposed within said body, comprising,
a first latching member having a first latching portion disposed thereon and adjacent to one of said passageways,
a second latching member having a second latching portion disposed thereon and adjacent to another of said passageways;
a connecting arm configured to be moved to at least a first position and a second position, said connecting arm connected on a first end to said first latching member and connected on a second end to the second latching member such that
moving said connecting arm to said first position forces said first latching portion and said second latching portion to extend through respective of said passageways, and
moving said connecting arm to said second position causes said first latching portion and said second latching portion to be withdrawn from respective of said passageways; and a main switch attached to said apparatus body and configured to be moved between an ON position and an OFF position, said main switch connected to said first latching member and configured to move said connecting arm to said first position when moved to said ON position and to said second position when moved to said OFF position, said connector of said peripheral device being locked in place in said receptacle when said main switch is in said ON position and being unlocked when in said OFF position.

2. The apparatus of claim 1, wherein:

said main switch comprises a main power switch for said apparatus, said main power switch controlling an ON/OFF operational state of said apparatus; and said receptacle configured to receive said electrical current in a form of direct current power from said connector only when said main switch is in said ON position and said connector is locked in place, said peripheral device comprising an alternating current adapter configured to provide a direct current power through said connector.

3. The apparatus of claim 2, wherein said first latching portion and said second latching portion are adapted to fit in respective depression areas formed in said connector when said connector is locked in place.

4. The apparatus of claim 3, wherein said first latching portion and said second latching portion comprise a conductive material that electrically and mechanically connects with said respective depression areas of said connector, said depression areas of said connector also comprising a conductive material.

5. The apparatus of claim 2, wherein:

said first latching portion and said second latching portion being retractably disposed on said first latching member and said second latching member, respectively, said first latching portion and said second latching portion retracting at least part way into respective of said passageways when said main switch is in said ON position and said connector is moved through said receptacle opening.

6. The apparatus of claim 5, wherein said first latching member and said second latching member each comprise a spring that urges respective of said first latching portion and said second latching portion toward said generally hollow internal portion of said receptacle.

7. The apparatus of claim 5, wherein said first latching portion and said second latching portion each comprise a tapered face oriented to oppose a direction in which said connector is moved through said receptacle opening.

8. The apparatus of claim 1, further comprising a compulsory unlocking button that is configured to, when depressed, cause said first locking portion and said second locking portion to retract into said respective passageways thereby unlocking said connector of said peripheral device so the connector may be removed from said receptacle even though said main switch is in said ON position.

9. The apparatus of claim 1, further comprising:

said peripheral device; and a control circuit comprising, an electrical current source that provides the electrical current to said receptacle, a detector that detects when said first and second latching portions are connected to said connector, and a current flow control device coupled to said detector and said electrical current source, said current flow control device enabling said electrical current to flow to said receptacle when said detector detects a connection exists, and prevents said electrical current from flowing when said detector does not detect a connection.

10. An apparatus for lockably connecting a connector of a peripheral device thereto, said apparatus comprising:

means for receiving said connector in a body of an apparatus, said means for receiving comprising a receptacle means;

means for accepting an electrical current from said connector;

means for controlling an ON state and an OFF state of said apparatus; and locking means for locking said connector in said receptacle means only when said connector is placed within said receptacle means and said means for controlling causes said apparatus to be in said ON state, said locking means including, means for latching said connector in said receptacle means by inserting latching portions into respective receiving portions of said connector when said means for controlling is placed in said ON state, means for coordinating said latching portions to be inserted into said receiving portions by a movement of said means for controlling when said means for controlling is placed in said ON state.

11. The apparatus of claim 10, wherein said receptacle means is for receiving a direct current as said electrical current, and said peripheral device being an alternating current adapter.

12. The apparatus of claim 11, wherein said latching portions include latching portion means for being projected into a depression area formed in said respective receiving portions of said connector when said connector is in said receptacle means in order to lock the connector of the peripheral device in the receptacle means.

13. The apparatus of claim 12, wherein:

said receptacle means has an internal portion that receives said connector; and said latching portion means is for allowing said connector to be inserted into said receptacle means and locking said connector in place after said means for controlling has caused said apparatus to be in said ON state.

14. The apparatus of claim 13, further comprising bias means that urge said latching portion toward said internal portion of said receptacle means so that said latching portion move into said depression area of said connector after said connector is fully inserted into said receptacle means.

15. The apparatus of claim 10, further comprising compulsory unlocking means for unlocking said connector even though said means for controlling causes said apparatus to remain in said ON state.

16. The apparatus of claim 10, further comprising said peripheral device, said peripheral device comprising, electrical current source means for providing the electrical current to said receptacle means, detector means for detecting when the connector is locked in place by the locking means, and current flow control means for allowing said current to flow to said receptacle means when said detector means detects that the connector is locked in place and for preventing the current from flowing to the receptacle means when said detector means detects that the connector is not locked in place.

* * * * *